United States Patent
Tsai

(10) Patent No.: US 8,953,177 B2
(45) Date of Patent: Feb. 10, 2015

(54) THICKNESS MEASURING DEVICE

(71) Applicant: Jeteazy System Co., Ltd., Hsinchu (TW)

(72) Inventor: Cheng-Hsin Tsai, Hsinchu (TW)

(73) Assignee: Jeteazy System Co., Ltd., Hsinchu (TW)

( * ) Notice: Subject to any disclaimer, the term of this patent is extended or adjusted under 35 U.S.C. 154(b) by 88 days.

(21) Appl. No.: 13/835,736

(22) Filed: Mar. 15, 2013

(65) Prior Publication Data
US 2014/0268182 A1    Sep. 18, 2014

(51) Int. Cl.
*G01B 11/28*    (2006.01)
*G01B 11/06*    (2006.01)
*G01B 5/207*    (2006.01)

(52) U.S. Cl.
CPC ............. *G01B 11/06* (2013.01); *G01B 5/207* (2013.01)
USPC .......................................................... 356/630

(58) Field of Classification Search
CPC .... G02B 1/043; G02B 21/0056; G02B 21/32; G02B 27/48; G02B 5/126; G01N 2021/6439; G01N 2021/6421; G01N 21/6456; G01N 2021/6491; G01N 21/4795; G01N 21/648; G01N 33/54373; G01N 2021/0346
See application file for complete search history.

(56) References Cited

U.S. PATENT DOCUMENTS

| | | | | |
|---|---|---|---|---|
| 6,154,041 A | * | 11/2000 | Cheng | 324/762.05 |
| 6,319,093 B1 | * | 11/2001 | Lebel et al. | 451/6 |
| 8,059,282 B2 | * | 11/2011 | Yang | 356/630 |
| 2009/0168079 A1 | * | 7/2009 | Yang | 356/630 |
| 2011/0235058 A1 | * | 9/2011 | Price et al. | 356/630 |

* cited by examiner

*Primary Examiner* — Michael P Stafira
(74) *Attorney, Agent, or Firm* — Kolisch Hartwell, P.C.

(57) ABSTRACT

A thickness measuring device for measuring an object includes a thickness measuring component and a sensing determining means. The thickness measuring component includes a plurality of measuring members provided respectively in correspondence with a plurality of the objects and a holding member. The measuring member is a probe and the holding member includes a plurality of channels. Each measuring member is held by each channel so that each measuring member is operated by the holding member to respectively measure one object by moving itself along an extending direction and/or by irradiating a light to the object. The sensing determining means retrieves an image of the measuring member and/or an image of the light reflected from the object to further obtain and display a thickness value of the object. The thickness measuring device of the present invention is more effective and inexpensive.

8 Claims, 6 Drawing Sheets the present invention relates to a thickness measuring device, and more particularly to a thickness measuring device that is able to measure a plurality of objects at the same time.

BACKGROUND OF THE INVENTION

The conventional technique for measuring thickness of an object is commonly applied by using a measuring device that includes a fixed body and a flexible component connecting with an electro optic system. The flexible component is capable of being stretched or compressed relatively to the fixed body. While the flexible component has been touching the object, a displacement of the flexible component relative to the fixed body is detected by the electro optic system, so the thickness of the object is obtained.

However, the technique applying the electro optic system is very complicated, and the purchase cost and the maintenance cost for the measuring device is also very expensive. Moreover when more than one measuring device is required while a plural objects are measured at the same time, the cost become remarkable.

SUMMARY OF THE INVENTION

Accordingly, an aspect of the present invention is to provide a thickness measuring device which is able to measure a plural objects but still keeps the cost down.

The thickness measuring device comprises a thickness measuring component and a sensing determining means. The thickness measuring component includes a plurality of measuring members and a holding member. The measuring member is a probe and the holding member includes a plurality of channels. Each probe is held by each channel. Each measuring member is provided to respectively correspond to one object. And each measuring member is operated by the holding members so that the measuring member respectively measures one object by moving itself along an extending direction and/or by irradiating a light to the object. The sensing determining means includes an image retrieving component, a computing component, and a displaying component. The image retrieving component retrieves an image of the measuring member and/or an image of the light reflected from the object to obtain an image information. The computing component computes the image information to obtain a thickness value. The displaying component displays the thickness value.

According to an embodiment of the present invention, the measuring member is a laser emitter.

According to an embodiment of the present invention, the image retrieving component is a linear charge-coupled device.

According to an embodiment of the present invention, the computing device stores the thickness value.

According to an embodiment of the present invention, a software program is installed in the computing device for computing the image information.

According to an embodiment of the present invention, it further comprises a reference board provided under the plurality of channels.

According to an embodiment of the present invention, the channel is corresponding to the object on the reference board.

According to an embodiment of the present invention, the reference board has a flat surface.

By means of technical means of the present invention, the thickness of the object can be obtained by a more convenient method. Since the cost of the thickness measuring device performing that method is more inexpensive, it is advantageous for users with less purchasing cost and easier maintaining effort for the thickness measuring device. Moreover, a plural objects can be measured at the same time. And even if the amount of objects for measuring increases, the operation step of the method and the cost of the thickness measuring device does not become more complicated. So the method and the thickness measuring device of the present invention are more effective.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The First Embodiment

Figure 1:
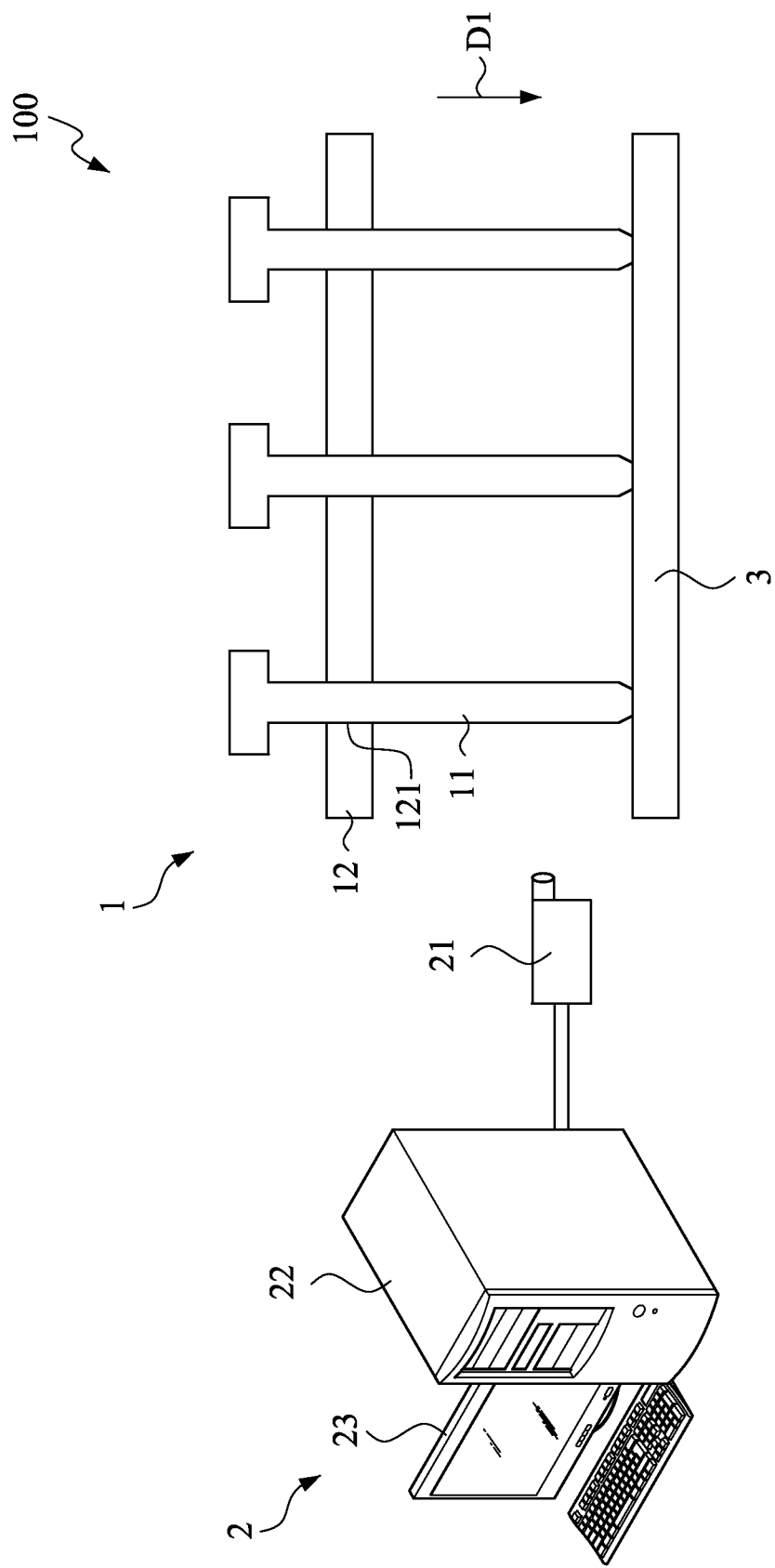
FIG. 1 is a schematic diagram illustrating the measuring member that is in a situation of contacting the reference board according to the first embodiment of the present invention.
Figure 2:
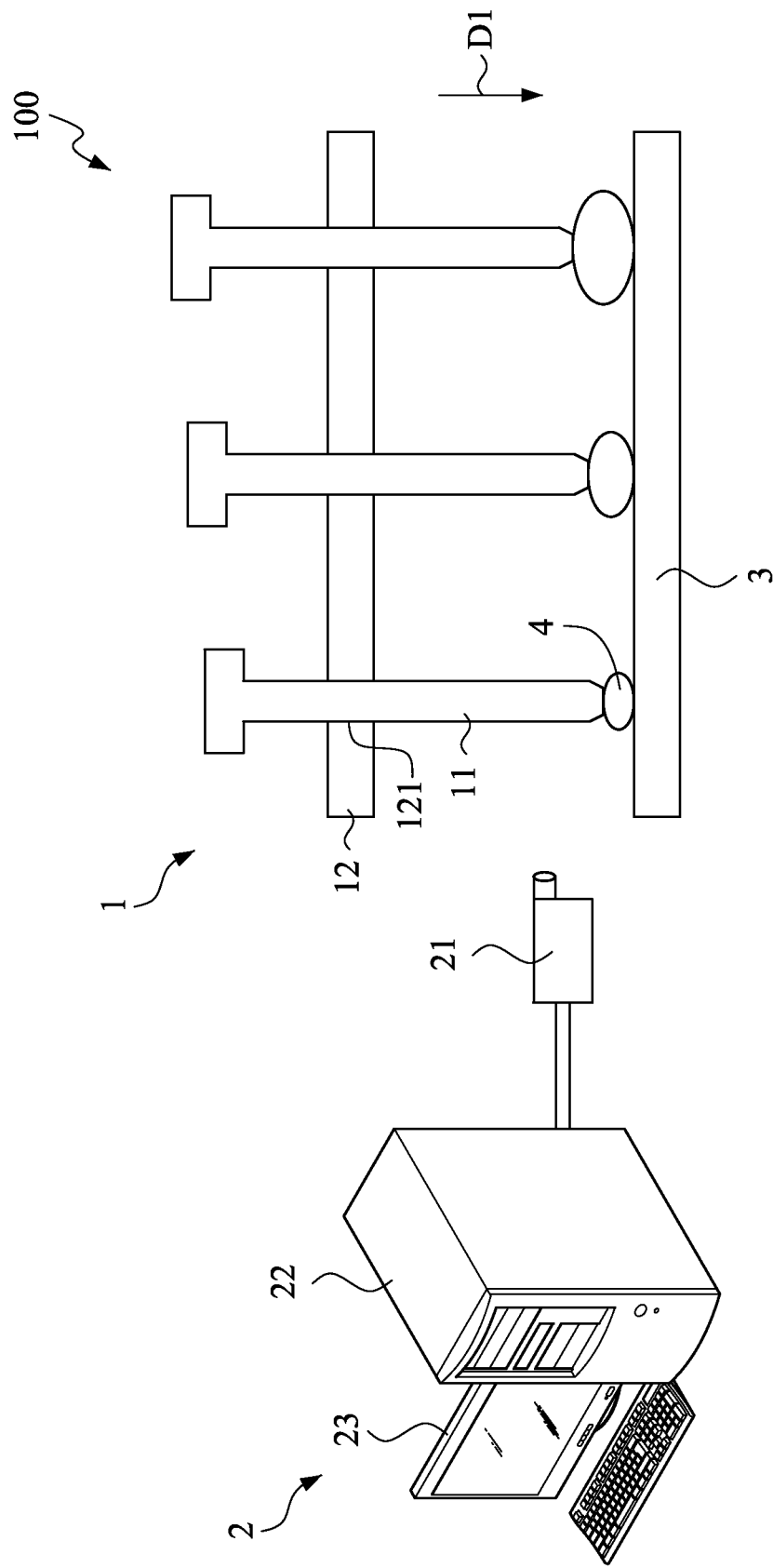
FIG. 2 is a schematic diagram illustrating the measuring member that is in situation of contacting the object according to the first embodiment of the present invention.
Figure 3:
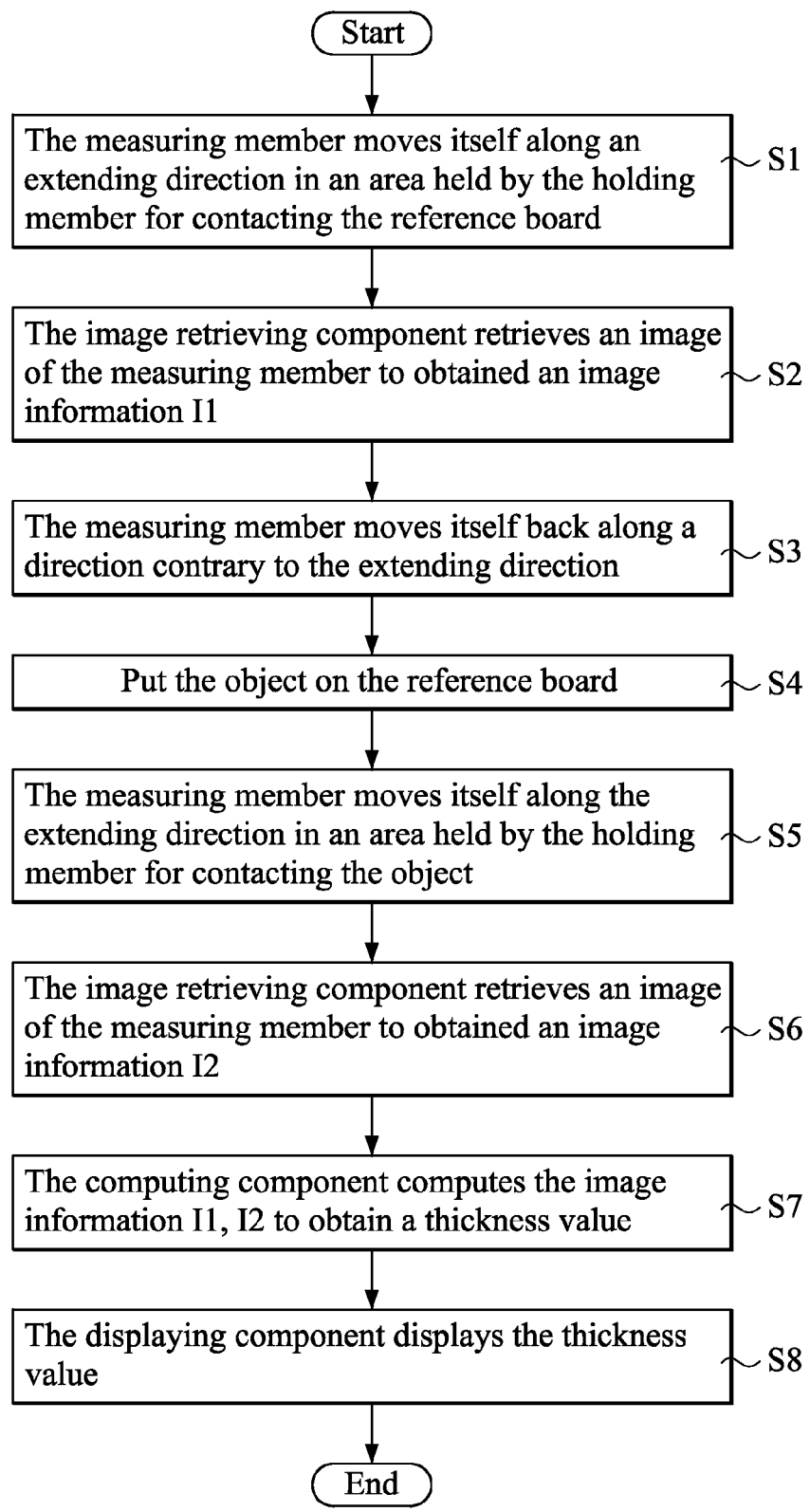
FIG. 3 is a flowchart illustrating the application of the thickness measuring device according to the first embodiment of the present invention.

Refer to FIGS. 1, 2 and 3. FIG. 1 is a schematic diagram illustrating the measuring member that is in a situation of contacting the reference board according to the first embodiment of the present invention. FIG. 2 is a schematic diagram illustrating the measuring member that is in a situation of contacting the object according to the first embodiment of the present invention. FIG. 3 is a flowchart illustrating the application of the thickness measuring device according to the first embodiment of the present invention.

The thickness measuring device 100 is provided for measuring a thickness of an object 4. The thickness measuring device 100 according to the first embodiment of the present invention includes a thickness measuring component 1 and a sensing determining means 2.

The thickness measuring component 1 includes a plurality of measuring members 11. Each measuring member 11 is respectively provided for one object 4 located at different position. In this embodiment, the measuring member 11 is a probe. The thickness measuring component 1 has a holding member 12. The holding member 12 includes a plurality of channels 121 for holding the measuring members 11. A reference board 3 is provided for laying a plurality of the objects 4, and the reference board 3 is provided under the plurality of channels 121. In this embodiment, the reference board 3 has a flat surface, so that every object 4 has the same reference level in height. The sensing determining means 2 includes an image retrieving component 21, a computing component 22, and a displaying component 23.

As shown in FIG. 3, the application of the thickness measuring device 100 of the first embodiment includes the steps as follows. First, every measuring member 11 moves itself along an extending direction D1 synchronously in an area held by the holding member 12 for contacting the reference board 3 (step S1), as shown in FIG. 1. Second, the image retrieving component 21 retrieves an image of the measuring member 11 to obtain an image information I1 (step S2). The image retrieving component 21 may be a photographic camera or a video camera. After step S2, every measuring member 11 moves itself back along a direction contrary to the extending direction D1 (step S3). And then the object 4 is carried on the reference board 3 (step S4) at a position that the object 4 corresponds to one channel 121, and thus the measuring member 11 moving within the channel 121 corresponds to the object 4 in its position.

Then, the measuring member 11 moves along the extending direction D1 synchronous held by the holding member 12 again for contacting the object 4 (step S5), as shown in FIG. 2. And then the image retrieving component 21 retrieves an image of the measuring member 11 again to obtain an image information I2 (step S6).

Finally, the computing component 22 computes the image information I1, I2 to obtain a thickness value that equals to the thickness of the object 4 (step S7). In this embodiment, the computing component 22 is a computer, and a software program is installed in the computing device 22 for computing the image information I1, I2. Then the displaying component 23 displays the thickness value (step S8). The displaying component 23 may be a computer screen, a television, or a projector. Furthermore, in a preferred embodiment, it may further include a step that the computing device 22 stores the thickness value after step S7 so that the thickness value can be recorded automatically for further usage.

The range of the image retrieved by the image retrieving component 21 is limited. In the case that there are a lot of objects 4 to be measured, a plurality of the image retrieving components 21 may be provided for retrieving the images of a plurality of the measuring members 11. Furthermore, a plurality of the computing components 22 may be provided for receiving the image information form the plurality of the image retrieving components 21 so as to enhance the computation efficacy of the image information.

Calibration of the First Embodiment

Figure 4:
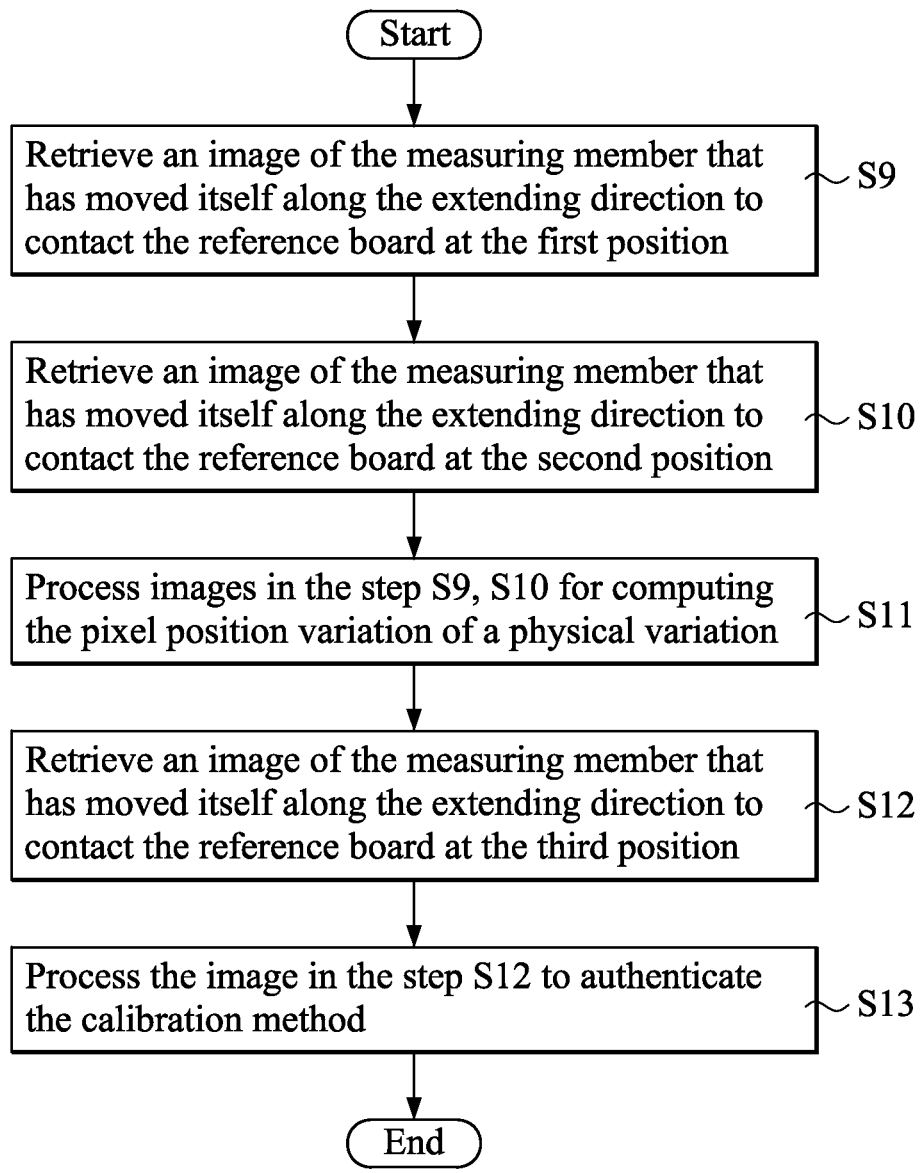
FIG. 4 is a flowchart illustrating the calibration of the thickness measuring device according to the first embodiment of the present invention.
Figure 5:
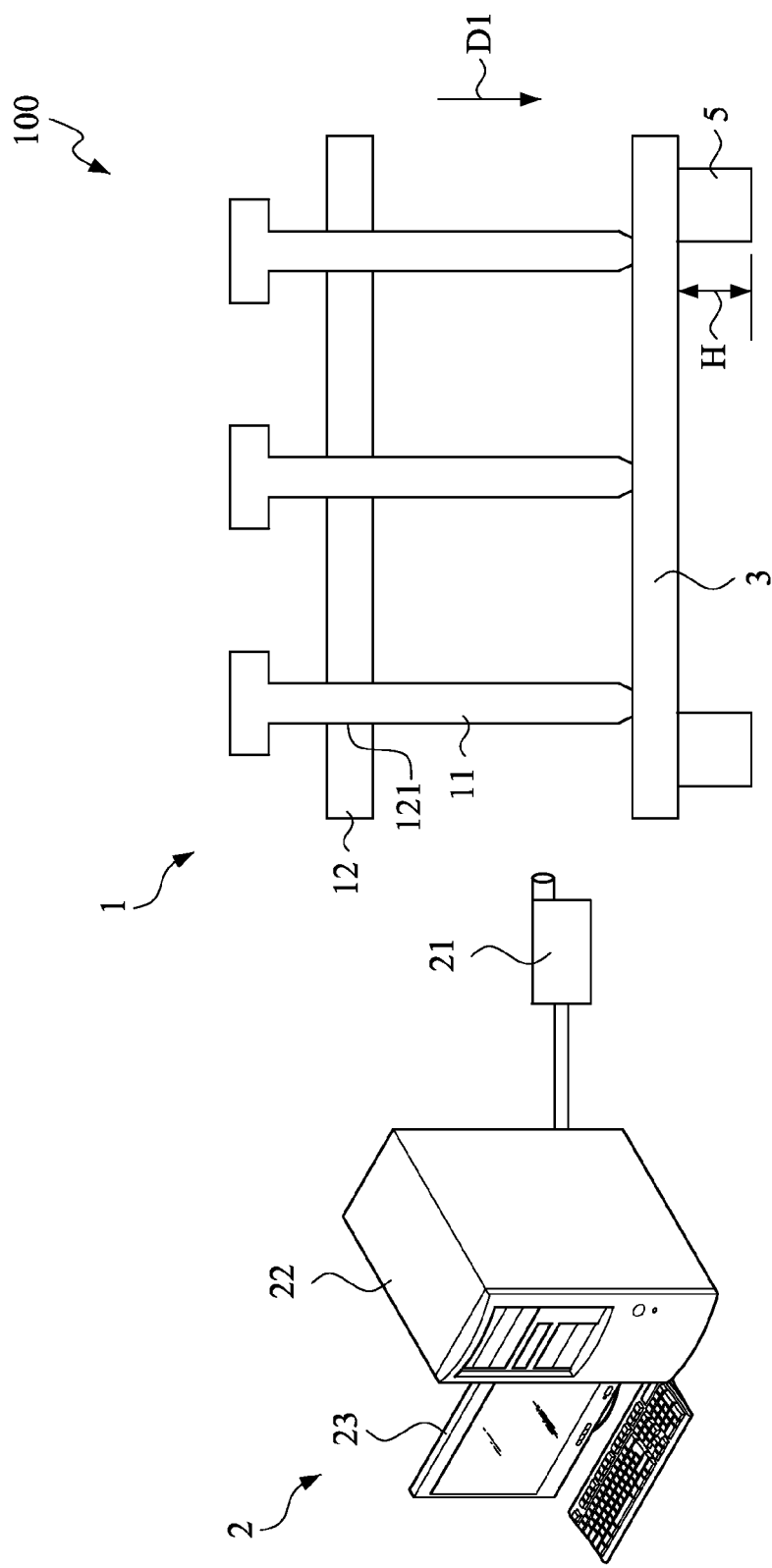
FIG. 5 is a schematic diagram illustrating the measuring member that is in situation of calibration according to the first embodiment of the present invention.

In order to obtain an accurate measuring result of the thickness of the object 4, i.e., object to be tested, it further includes a calibration method in the first embodiment, as shown in FIG. 4. The calibration method includes steps described as follows. First, a block gauge 5 is provided for supporting a reference board 3 in a specific height H, as shown in FIG. 5. In this embodiment, the reference board 3 is initially located at the first position with 13 mm height, i.e., the block gauge 5 is with 13 mm. Then the image retrieving component 21 retrieves an image of the measuring member 11 that has moved itself along the extending direction D1 to contact the reference board 3 at the first position (step S9). Second, a block gauge 5 is provided for supporting a reference board 3 in 15 mm height, i.e., the block gauge 5 is with 15 mm. Then the image retrieving component 21 retrieves an image of the measuring member 11 that has moved itself along the extending direction D1 to contact the reference board 3 at the second position (step S10). Third, by using the image in the step S9 and the image in the step S10, the computing component 22 processes those images for computing the pixel position variation of 2 mm (15 mm minus 13 mm) physical variation (step S11). After step S11, the position of the images at any position can be determined by the resolution retrieved by the image retrieving component 21, so that the distance of the movement of the measuring member 11 can be estimated. In order for authentication, the image retrieving component 21 retrieves an image of the measuring member 11 that has moved itself along the extending direction D1 to contact the reference board 3 at the third position such as 14 mm height (step S12). Furthermore, the computing component 22 processes the image in the step S12 to determine whether the distance of the movement of the measuring member 11 is 1 mm (14 mm minus 13 mm) or not (step S13). If the distance of the movement of the measuring member 11 is determined as 1 mm by the computing component 22, the calibration method in the first embodiment of the present invention can be authenticated. Thereafter, any distance that the measuring member 11 moved is able to be determined.

The Second Embodiment

Figure 6:
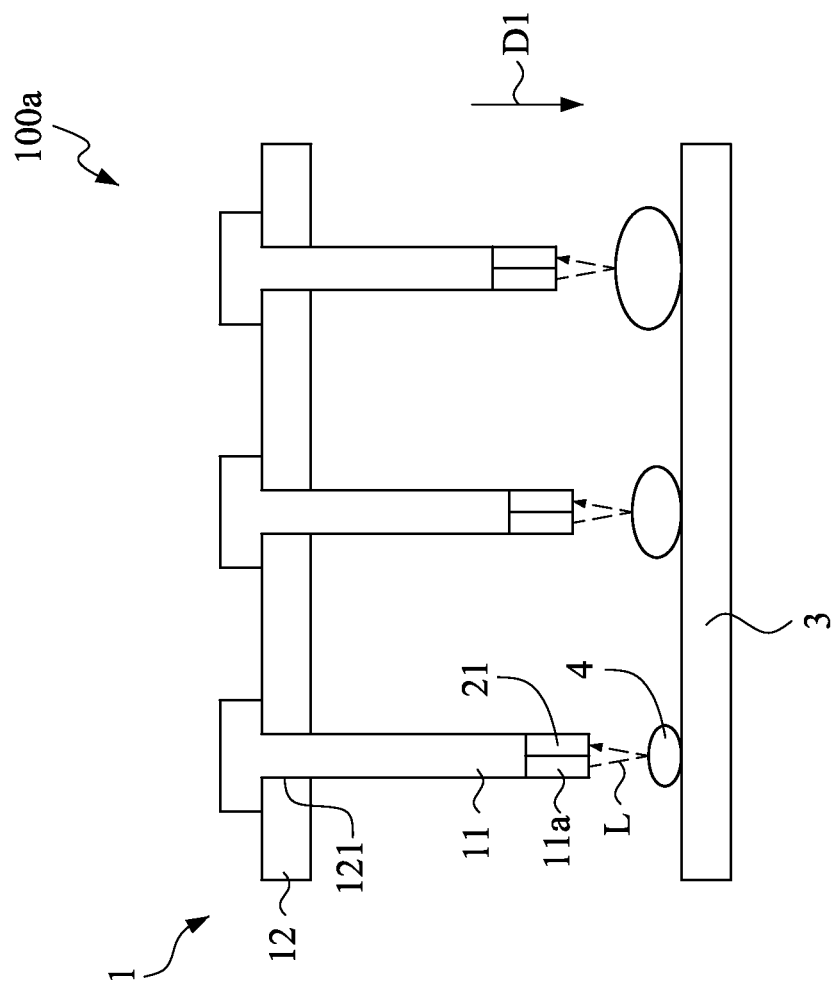
FIG. 6 is a schematic diagram illustrating the thickness measuring device according to the second embodiment of the present invention.
Figure 6:
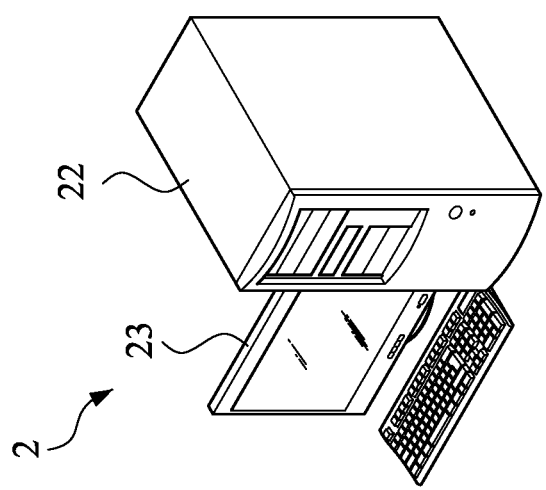

Refer to FIG. 6. FIG. 6 is a schematic diagram illustrating the thickness measuring device of the second embodiment according to the present invention. The elements of this embodiment illustrated in this Fig. are similar to those in the first embodiment. The thickness measuring device 100a of the second embodiment is different from the thickness measuring device 100 of the first embodiment as follows. In this embodiment, the measuring member 11a is a laser emitter. The measuring member 11a measures the object 4 by irradiating a light L to one object 4 respectively. The image retrieving component 21 is a linear charge-coupled device (CCD). The image retrieving component 21 retrieves an image of the light L reflected from the object 4 so as to obtain an image information of the light L for having the computation of computing component 22 so as to obtain the thickness value of the object 4.

Overall, it is easy to purchase and to maintain the component of the thickness measuring device of the present invention, such as the image retrieving component, the computing component, the displaying component, the holding member, and the measuring member. The thickness measuring device of the present invention is more inexpensive and the measuring method of the present invention is more convenient and effective.

The above description should be considered as only the discussion of the preferred embodiments of the present invention. However, a person skilled in the art may make various modifications to the present invention. Those modifications still fall within the spirit and scope defined by the appended claims.

What is claimed is:

1. A thickness measuring device for measuring a thickness of an object, the thickness measuring device comprising:
   a thickness measuring component including a plurality of measuring members and a holding member, the measuring member being a probe and the holding member including a plurality of channels, each probe being held by each channel, each member being provided respectively in correspondence with one object, and each measuring member being operated by the holding member to respectively measure one object by moving itself along an extending direction and/or by irradiating a light to the object; and a sensing determining means including an image retrieving component, a computing component, and a displaying component, the image retrieving component retrieving an image of the measuring member and/or an image of the light reflected from the object to obtain an image information, the computing component computing the image information to obtain a thickness value, the displaying component displaying the thickness value.

2. The thickness measuring device as claimed in claim 1, wherein the measuring member is a laser emitter.

3. The thickness measuring device as claimed in claim 1, wherein the image retrieving component is a linear charge-coupled device.

4. The thickness measuring device as claimed in claim 1, wherein the computing device stores the thickness value.

5. The thickness measuring device as claimed in claim 1, wherein a software program is installed in the computing device for computing the image information.

6. The thickness measuring device as claimed in claim 1, further comprising a reference board provided under the plurality of channels.

7. The thickness measuring device as claimed in claim 6, wherein the channel is corresponding to the object on the reference board.

8. The thickness measuring device as claimed in claim 6, wherein the reference board has a flat surface.

* * * * *